United States Patent [19]

Hoffman

[11] 3,715,413
[45] Feb. 6, 1973

[54] VINYL CHLORIDE-PROPYLENE COPOLYMER GRAFTED WITH BUTADIENE, α-METHACRYLONITRILE AND OPTIONALLY STYRENE

[75] Inventor: Joseph K. Hoffman, Glen Gardner, N.J.

[73] Assignee: Air Reduction Company, Incorporated, New York, N.Y.

[22] Filed: Dec. 28, 1970

[21] Appl. No.: 102,206

[52] U.S. Cl............260/878 R, 260/23.7, 260/45.75, 260/879, 260/884
[51] Int. Cl................................................C08f 15/00
[58] Field of Search..........................260/878 R, 884

[56] References Cited

UNITED STATES PATENTS

| | | | |
|---|---|---|---|
| 3,327,022 | 6/1967 | Riou et al. | 260/878 R |
| 3,468,858 | 9/1969 | Heiberger et al. | 260/87.5 C |
| 3,330,886 | 7/1967 | Riou et al. | 260/884 |

*Primary Examiner*—James A. Seidleck
*Assistant Examiner*—A. Holler
*Attorney*—Barry Moyerman and B. Max Klevit

[57] ABSTRACT

A substantially clear resin having good impact and processability is prepared by graft polymerizing vinyl chloride-propylene copolymers with butadiene-1,3 or isoprene or mixtures thereof, alpha-methacrylonitrile or acrylonitrile and optionally a small amount of styrene and/or methyl methacrylate.

5 Claims, No Drawings

VINYL CHLORIDE-PROPYLENE COPOLYMER GRAFTED WITH BUTADIENE, α-METHACRYLONITRILE AND OPTIONALLY STYRENE

This invention relates to the improvement of the impact strength of vinyl chloride-propylene copolymers. More particularly, it concerns a graft copolymer of vinyl chloride-propylene copolymer with butadiene and/or isoprene, alpha-methacrylonitrile and/or acrylonitrile and (optionally) styrene and/or methyl methacrylate.

Thermoplastic vinyl chloride-propylene copolymers, for example containing about 2 to 10 weight percent propylene as described in U.S. Pat. No. 3,468,858 to Heiberger et al., have found extensive use for fabricating rigid shaped articles. The copolymers are useful for such forming operations as hot molding, extrusion, and thermoforming. It would be desirable, however, if there were some method for increasing the impact resistance of these copolymers for these types of operations. Additionally, it would be desirable to produce such improved copolymers which are clear.

It has now been discovered that the impact strength of a vinyl chloride-propylene copolymer can be substantially increased and the graft copolymer rendered substantially clear by graft polymerizing a mixture of the copolymer with about 5 to 15 parts, preferably about 8 to 10 parts, for each 100 parts by weight of the copolymer, of butadiene-1,3 or isoprene or mixtures thereof, about 1 to 4 parts, preferably about 1.5 to 3 parts, for each 100 parts by weight of the copolymer, of alpha-methacrylonitrile or acrylonitrile, and 0 to about 3.5 parts, preferably about 1.5 to 3 parts, for each 100 parts by weight of the copolymer, of styrene. Additionally up to about 50 percent of the combined styrene and alpha-methacrylonitrile or acrylonitrile can be replaced with methyl methacrylate without reducing the impact resistance, but such introduction produces cloudiness in the resin and, therefore, its use is limited to certain applications. Generally, it is preferable not to use so much methyl methacrylate that the haze value of the resin is increased above 25 percent.

The vinyl chloride-propylene copolymer which is most suitably treated by the process of this invention is a thermoplastic copolymer containing about 90 to 98 weight percent, preferably about 93 to 97 weight percent, of polymerized vinyl chloride, and having an intrinsic viscosity of about 0.5 to 1.5 dl./g., preferably about 0.55 to 0.95 dl./g., a melt flow rate of at least about 0.1 dg./min., preferably at least about 1 dg./min., and will usually have a $t_{1,500}$ of at least about 20, preferably above 50 minutes, often up to about 100 or 200, or more, minutes. The $t_{rel}$ of the resin is usually at least about 1.5 or 2.0, and even up to about 4 or 5 with respect to a vinyl chloride homopolymer of the same intrinsic viscosity. Particularly suitable vinyl chloride-propylene copolymers are those disclosed in U.S. Pat. No. 3,463,858 of C.A. Heiberger and L. Fishbein.

As disclosed in that patent, the vinyl chloride and the propylene can be suitably polymerized in a suspension polymerization system with a free-radical catalyst such as lauroyl peroxide, t-butyl peroxypivalate, benzoyl peroxide, azo-alpha, alpha'-diisobutyronitrile, and the like. Temperatures of about 5° to 75° C. and pressures up to about 250 lb./sq. inch are generally suitable for the polymerization.

The grafting of the butadiene, alpha-methacrylonitrile, acrylonitrile, methyl methacrylate and styrene onto the vinyl chloride-propylene copolymer can advantageously be effected using a free radical catalyzed, aqueous suspension, addition polymerization system. Suitable graft polymerization temperatures are generally about 20° to 80° C., preferably about 45° to 70° C. The reaction mixture is preferably kept under constant agitation during the polymerization, and the pH of the suspension is preferably maintained at about 7 to 10, usually about 9 to 10. Preferably, the graft polymerization is effected under a pressure of about 80 to 120, usually about 90 to 110 pounds per square inch gauge.

Various suspending agents such as those which have been disclosed for use in the suspension polymerization of vinyl chloride can be employed, and examples of suitable suspending agents include polyvinyl alcohol, methyl cellulose (e.g. the products known commercially as "Methocel"), gelatin, magnesium carbonate, guar gum, silica, magnesium lauryl sulfate, and magnesium silicate.

Suitable as catalysts, or initiators, are the oil soluble, free-radical catalysts such as the organic peroxides (e.g., "Lupersol 226," "Luerpsol 227," lauroyl peroxide, tert-butyl peroxypivalate, 2,4-dichlorobenzoyl peroxide, isopropyl peroxypercarbonate, and benzoyl peroxide) or the azo-nitrile catalysts, such as disclosed in Hunt U.S. Pat. No. 2,471,959 e.g., azo-alpha, alpha'-diisobutyronitrile (which is commercially referred to in the art as "AZN"), 2,2'-azo-bis (γ,γ'-dimethyl)-valeronitrile and 2-(tert-butyl-azo)-2-phenyl propane. Also, particularly suitable is the use of a water-soluble promoter such as sodium bisulfite in combination with the oil soluble free-radical catalyst.

The quantity of suspending agent can vary widely, but most suitably it is present in the amount of 0.01 to 0.5 percent, based upon the total weight of the vinyl chloride-propylene copolymer and the monomers in the aqueous system, preferably about 0.02 to 0.2 percent by weight. Similarly, the quantity of catalyst can vary, but best results are obtained when the catalyst is present in the amount of about 0.01 to 2.0 percent, preferably about 0.05 to 0.5 percent, based on the combined weight of the vinyl chloride-propylene copolymer and the monomers in the system.

The aqueous suspension polymerization system also may advantageously include a wetting agent in the amount of about 0.001 to 1.0 percent by weight of the copolymer and monomers, preferably about 0.005 to 0.5 percent by weight. Any of the many wetting agents used in suspension polymerization systems may be employed, but most preferably the wetting agent is sodium di-octyl sulfosuccinate, i.e., the product sold commercially as "Aerosol-O.T."

In order to maintain the pH of the suspension system at the desired value, there is suitably added an alkaline buffering agent of any convenient type. Any alkaline material which is compatible with the suspending agent can be used as the buffer. The amount of buffer is that sufficient to adjust the pH of the suspension within the desired range. Ammonium and sodium bicarbonate are preferred buffers because of their compatibility with the system and their low cost. The amount of buffer is generally about 0.1 to 0.5 percent by weight, based on the copolymer and monomers. Other buffers such as disodium phosphate, sodium acetate, and the like, can, however, also be used. When superior electrical properties are desired in the product, a nonmetallic buffer, such as ammonium bicarbonate, is preferred.

The amount of water used is that which is sufficient to accommodate the various components of the system and to support the resultant copolymer in suspension in a conventional manner. Thus, ordinarily the suspension contains about 100 to 400 percent water, based on the combined weight of the copolymer and monomer.

In carrying out the polymerization operation, a solution of the suspending agent and wetting agent is preferably first prepared. This is effected by dissolving the wetting agent in sufficient water to form a solution, followed by the portionwise addition of the suspending agent, while stirring the solution vigorously. Alternatively, the suspending agent and the wetting agent can be separately dissolved and the resulting solutions combined. Although it is not necessary to do so, the foregoing steps are suitably carried out with the water at a slightly elevated temperature, e.g. 75° –80° C., and after the solution has been formed it is allowed to cool to room temperature. The foregoing solution is then diluted with enough water to form the desired volume to be charged to the polymerization vessel, and the buffering agent is dissolved in the solution.

The solution is then, in the case of batch polymerization, charged to a suitable polymerization vessel, such as an autoclave constructed to withstand pressures up to about 250 pounds per square inch. The autoclave is sealed and flushed with nitrogen. Agitation of the reactor contents is begun, and the copolymer and monomers are introduced. The polymerization system is then brought to reaction temperature, e.g., 55° C., and the catalyst is introduced, with constant agitation, and reaction is continued until the desired polymerization is achieved. The time of reaction will, of course, vary, depending upon the size of the apparatus, the quantities of the reactants employed, and the extent of polymerization desired. Reaction times of about 3 to 8 hours will be generally adequate to obtain a graft copolymer product having the preferred properties discussed below. Alternately, the vinyl chloride-propylene copolymer is not isolated as a solid product but is used as polymerized in an aqueous suspension, which is vented to remove unreacted vinyl chloride and propylene monomers. Additional catalyst and grafting monomers are added, and polymerization is continued at the desired temperature.

The graft copolymer product produced by the process of this invention is light in color and can be used in conventional molding, extrusion, or other hot shaping apparatus, under the conditions at which such apparatuses are designed to operate, to produce quality rigid products efficiently and effectively. Attempts to replace the alpha-methacrylonitrile used in this invention with acrylonitrile have resulted in the introduction of some yellow color while retaining clarity, impact and other desirable properties of the graft copolymer. Similarly, replacement of the vinyl chloride-propylene copolymer with polyvinyl chloride homopolymer results in a substantial lessening of the processability characteristics of the graft copolymer of this invention.

The preferred graft copolymer produced by the process of the present invention usually has an intrinsic viscosity of about 0.5 to 1.5 dl./g., preferably about 0.6 to 0.8 or 0.9 dl./g.; a melt flow rate which is usually at least about 0.1 dg./min., preferably at least about 1, and often up to about 5 or even 25 or more, dg./min.; a notched Izod impact strength which is usually at least about 1 or 2 ft./lb./in., often up to 5 or 10 ft.lb./in., and even up to about 20 or more, ft./lb./in.; a haze value which is usually below about 25 percent and most preferably below about 15 or even 10 percent; a $t_{1,500}$ of at least about 10 inutes, and often up to about 25 or 50, or more minutes; and a $t_{rel}$ usually of at least about 1.5, often 2 or 4, or more, over a polyvinyl chloride homopolymer graft of the same molecular weight and grafted monomer content. The chemical composition of the graft copolymer, in terms of polymerized monomer ratios, is approximately the same as for the starting materials in the reaction mixture.

Intrinsic viscosity values in dl./g., as used herein, are determined in the conventional manner by extrapolation to infinite dilution of the reduced viscosity values at several concentrations of the polymeric material in cyclohexanone, as determined, for example, according to ASTM, D1243–60, Method A, but at 25° C. Weight percent propylene in the vinyl chloride-propylene copolymer is determined from chlorine analysis and correlated with volume percent propylene as determined by measurements of specific gravity (ASTM D792–60T) on a standard molded composition containing 3 parts by weight of an organic tin mercaptide stabilizer (Advastab T–360) per 100 parts by weight of copolymer. Melt flow rate is determined by means of ASTM D1238–57T, condition F, for the graft copolymer in the above standard molded composition. Izod impact strength is determined by means of ASTM D–256 for the graft copolymer in the above standard molded composition. The values $t_{1,500}$ and $t_{rel}$ are as determined by the Brabender Dynamic Stability test, which is described in the article entitled, "New Processability Concepts for Rigid Vinyls," by Heiberger, Phillips and Cantow, in "Polymer Engineering and Science," Volume 9, number 6, November 1969, pages 445–451. The stability is expressed in terms of $t_{1,500}$ indicating the time in minutes required to degrade the polymeric material at 1,500 m.g. torque. The ratio of the test material's $t_{1,500}$ value to the $t_{1,500}$ value for another resin such as polyvinyl chloride homopolymer graft of the same intrinsic viscosity and grafted monomer content is a practical measure of relative processability and is designated as $t_{rel}$ for the graft copolymers produced by the process of this invention. Haze value is expressed herein as the percent of the light scattered by the specimen and is as determined by ASTM D1003. A haze value of 10 percent or less produces a bottle which has excellent clarity.

While the invention has been described above in its broader terms, it will be more fully understood by reference to the following specific examples of practical application. In the examples, all parts are by weight unless otherwise indicated.

EXAMPLE I

A one-liter, stainless steel autoclave is employed as the reaction vessel. The autoclave is charged with the following mixture:

| Component | Amount |
|---|---|
| Vinyl chloride-propylene copolymer[1] | 100 g. |
| Butadiene-1,3 | 12 g. |
| Alpha-methacrylonitrile | 4 g. |
| Water (distilled) | 200 g. |
| Methyl cellulose, 100 cps ("Methocel 90 HG") | 0.1 g. |
| 75 Wt.% aqueous solution of sodium dioctylsulfosuccinate ("Aerosol O.T.") | 0.1 g. |
| Tert-butyl peroxypivalate ("Lupersol 11") | 0.2 g. |

The autoclave is flushed several times with nitrogen and the contents then agitated under a pressure of about 100 psig for about 5 hours at about 70° C.

The resultant graft copolymer analyzes as follows:

| | |
|---|---|
| Weight percent polymerized alpha-methacrylonitrile | 3.1 |
| Weight percent polymerized butadiene | 9.5 |
| Weight percent vinyl chloride-propylene copolymer | 87.4 |
| Melt flow rate (dg./min.) | 9 |
| Intrinsic viscosity (dl./g.) | 0.65 |
| Notched Izod impact strength (ft. lb./in.) | 14.5 |

[1] 96 Weight percent vinyl chloride; melt flow rate, 20 dg./min.; intrinsic viscosity, 0.65 dl./g.; notched Izod impact strength, 0.5 ft. lb./in.

EXAMPLE II

A 1-liter, stainless steel autoclave is again employed as the reaction vessel. The autoclave is charged with the following mixture:

| Component | Amount |
|---|---|
| Vinyl chloride-propylene copolymer[2] | 100 g. |
| Butadiene-1,3 | 12 g. |
| Alpha-methacrylonitrile | 2.8 g. |
| Styrene | 3.1 g. |
| Water (distilled) | 200 g. |
| "Methocel 90 HG" | 0.1 g. |
| "Aerosol-OT" | 0.1 g. |
| "Lupersol 11" | 0.2 g. |

The autoclave is flushed several times with nitrogen and the contents then agitated under a pressure of about 100 psig for about 3 hours at about 70° C.

The resultant graft copolymer analyzes as follows:

| | |
|---|---|
| Weight percent polymerized alpha-methacrylonitrile | 2.6 |
| Weight percent polymerized butadiene | 8.8 |
| Weight percent styrene | 2.6 |
| Weight percent vinyl chloride-propylene copolymer | 86.0 |
| Melt flow rate (dg./min.) | 8 |
| Intrinsic viscosity (dl./g.) | 0.67 |
| Notched Izod impact strength (ft. lb./in.) | 14.0 |

[2] Same as used in Example I.

EXAMPLES III – XIII

The procedure of Examples I and II was repeated eight more times in an agitated, one gallon autoclave for about 8 hours. In Run VIII, polyvinyl chloride homopolymer was used in place of the vinyl chloride-propylene copolymer and in Runs IX to XIII the starting monomers differed as shown. The monomers used and the properties of the graft copolymers were as follows:

TABLE I

| Example | III | IV | V | VI | VII | VIII |
|---|---|---|---|---|---|---|
| Ingredients: | | | | | | |
| Butadiene-1,3, g | 27 | 36 | 27 | 30 | 27 | 27 |
| Alpha-methacrylonitrile, g | 6.4 | 12 | 6.4 | 6.4 | 6.4 | 6.4 |
| Styrene, g | 7.2 | 0 | 8.1 | 7.2 | 7.2 | 7.2 |
| Water, g | 600 | 600 | 600 | 600 | 600 | 600 |
| Vinyl chloride-propylene copolymer, g | [1] 300 | [1] 300 | [1] 300 | [1] 300 | [1] 300 | [2] 300 |
| "Methocel 90 HG," g | 0.3 | 0.3 | 0.3 | 0.3 | 0.3 | 0.3 |
| "Aerosol-OT," g | 0.3 | 0.3 | 0.3 | 0.3 | 0.3 | 0.3 |
| "Lupersol 11," g | 1.2 | 0.6 | 1.2 | 1.2 | 1.2 | 1.2 |
| Reaction temperature, °C | 55 | 55 | 55 | 55 | 55 | 55 |
| Reaction time, hours | 7 | 7 | 7 | 7 | 7 | 7 |
| Graft copolymer properties: | | | | | | |
| Wt. percent polymerized alpha-methacrylonitrile | 1.5 | 3.5 | 1.4 | 1.4 | 1.4 | 1.4 |
| Wt. percent polymerized butadiene | 8.0 | 9.5 | 8.0 | 8.8 | 8.0 | 8.0 |
| Wt. percent polymerized styrene | 1.4 | 0 | 1.6 | 1.4 | 1.4 | 1.4 |
| Wt. percent vinyl chloride-propylene copolymer | 89.2 | 87.0 | 89.0 | 88.4 | 89.2 | 89.2 |
| Melt flow rate, dg./min | 9 | 8 | 10 | 10 | 14.3 | 2.7 |
| Intrinsic viscosity, dl./g | 0.64 | 0.67 | 0.65 | 0.63 | 0.64 | 0.64 |
| Notched Izod impact strength, ft. lb./in | 13.6 | 12.0 | 17.4 | 17.4 | 12.4 | 12.1 |
| $t_{1500}$, minutes | 65 | | 55 | | 64 | 32 |
| $t_{rel}$ | 2.0 | | 1.7 | | 2.0 | |

| Example | IX | X | XI | XII | XIII |
|---|---|---|---|---|---|
| Ingredients: | | | | | |
| Butadiene-1,3 g | 36 | 36 | | 36 | 18 |
| Isoprene, g | | | 45 | | |
| α-Methacrylonitrile, g | 9.6 | 7.2 | 12 | 4.8 | 8 |
| Styrene, g | 8.1 | 8.1 | | 8.1 | |
| Methyl methacrylate, g | | | | | 7.2 |
| Water, g | 600 | 600 | 600 | 600 | 600 |
| Vinyl chloride-propylene copolymer, g | [3] 300 | [4] 300 | [1] 300 | [1] 300 | [1] 300 |
| Methocel 90 HG, g | 0.3 | 0.3 | 0.3 | 0.3 | 0.3 |
| Aerosol-OT, g | 0.3 | 0.3 | 0.3 | 0.3 | 0.3 |
| Lupersol 11, g | 0.6 | 0.6 | 1.6 | 0.8 | 1.6 |
| Reaction temp., °C | 70 | 70 | 55 | 55 | 55 |
| Reaction time, hrs | 4 | 4 | 7 | 7 | 7 |
| Graft copolymer properties: | | | | | |
| Wt. percent α-methacrylonitrile | 2.7 | 2.7 | 3.3 | 1.4 | 2.4 |
| Wt. percent butadiene | 10.3 | 10.3 | | 10.0 | 7.0 |
| Wt. percent isoprene | | | 12.5 | | |
| Wt. percent styrene | 2.0 | 2.7 | | 2.0 | |
| Wt. percent methyl methacrylate | | | | | 2.0 |
| Wt. percent vinyl chloride-propylene copolymer | 85 | 84.3 | 84.2 | 84.6 | 91.6 |
| Melt flow rate, dg./min | 12 | 0.4 | 14.2 | 2.3 | 8.4 |
| Intrinsic viscosity, dl./g | 0.6 | 0.76 | 0.65 | 0.65 | 0.61 |
| Notched Izod impact, ft. lb./in | 3.3 | 22.3 | 12.6 | 21.1 | 1.3 |

[1] Same as Example I.
[2] Polyvinyl chloride homopolymer, intrinsic viscosity 0.64 d./g.
[3] 95 wt. percent VCl; MFR, 70 dg./min.; intrinsic viscosity 0.58 dl./g.; notched Izod impact, 0.4 ft. lb./in.
[4] 97 wt. percent VCl; MFR, 5 dg./min.; intrinsic viscosity 0.75 dl./g.; notched Izod impact, 0.55 ft. lb./in.

EXAMPLES XIV - XVIII

Graft copolymers were prepared having 88.5 wt. percent vinyl chloride-propylene copolymer; 8 wt. percent butadiene-1,3; 1.8 wt. percent alpha-methacrylonitrile and 1.8 wt. percent styrene. The heat stability oven time at 400° F. was 60 minutes for each graft copolymer. Additional properties of the graft copolymers are shown in Table II. The graft copolymers were compounded with a stabilizer comprising 0.5 phr Whitrex 309 and 3 phr Mark 292. The haze values of the compounded resin are set forth in Table II.

TABLE II

| Example | % Cl. content | Polymerization Time (hr.) | Intrinsic viscosity (dl./g.) | Melt Flow Rate (dg./min) | Izod Impact fpi | 30 mils % Haze |
|---|---|---|---|---|---|---|
| XIV | 48.4 | 5 | 0.60 | 14.3 | 12.4 | 4.8 |
| XV | 47.5 | 8 | 0.62 | 11.4 | 13.8 | 4.6 |
| XVI | 48.2 | 15 | 0.60 | 12.2 | 11.2 | 5.5 |
| XVII | 47.8 | 15 | 0.60 | 8.6 | 11.5 | 7.9 |
| XVIII | 48.6 | 7 | 0.61 | 10.3 | 12.2 | 8.1 | in the use of lubricants. In general, lubricants are used in amounts ranging from 0.1 to 1 percent or more, by weight of the graft copolymer. In general, the graft copolymer of this invention is suitably combined with 0.1 to 10 percent by weight of combined lubricant and stabilizer.

Other additives, such as fillers, pigments, plasticizers, and resin additives, are optional and are suitably used in appropriate quantity to give desired properties in the final products.

It will be apparent to those skilled in the art that various changes and modifications may be made in the embodiments described above without departing from the invention as defined in the appended claims. It is intended, therefore, that all matter contained in the foregoing description shall be interpreted as illustrative only and not as limitative of the invention.

The graft copolymer producible by the process of this invention is useful in the preparation of rigid resinous combinations by combining it with suitable stabilizers and lubricants, and it may also be compounded with fillers, pigments, and resin additives. Conventional compounding agents of a type well-known in the polymer art, and particularly in connection with vinyl resins, are suitably used. For example, suitable stabilizers include the well-known alkyl tin thioglycollate ("Thermolite 31"), di-octyl tin dilaurate, basic lead carbonate, metal phenates such as zinc, lead, or tin phenate, and barium n-nonyl phenate, fatty acid soaps of lead, cadmium, barium, calcium, magnesium, and zinc, cadmium benzoate, triphenyl phosphite, mono-octyl diphenyl phosphite, di(epoxyethyl)benzene, epoxidized fatty oils, manganous pyrophosphite, and the like, alone or in combination. The function of various stabilizers in such polymers is well known and is described, for example, in "Polymer Processes" by Schildknecht, pages 542–548. In general, any of the many stabilizers suitable for use with polyvinyl chloride may be employed. When the composition is to be used for food packaging or the like, the stabilizer and the other additives must be those which are approved for such use, i.e. they must be nontoxic. Approved additives are well known and typical approved stabilizers, for example, nontoxic stabilizers which include fatty acid soaps of metals of Group II of the Periodic Table having an atomic weight of less than 100, such as the calcium, magnesium, and zinc soaps of stearic, lauric, and ricinoleic acids, as well as the alkali metal soaps of fatty acids, and various wholly organic stabilizers.

In like manner, conventional lubricants, such as mineral oil, fatty acids, synthetic waxes of the fatty amide and ester types, octyl stearate and calcium stearate, can be used. Polymer lubricants are referred to in Schildknecht, pp. 685 et seq. The stabilizers and lubricants are used in varying quantities, such as described in the foregoing publication, depending upon the nature of the individual agent. For example, stabilizers are generally used in the amount of 0.5 to 5 percent by weight of the graft copolymer, but the overriding criterion is the use of a small amount sufficient to effect the desired stabilization. The same considerations apply

I claim:

1. A substantially clear graft copolymer having high impact and good, processability produced by graft polymerizing a mixture of (a) a vinyl chloride-propylene copolymer having a polymerized vinyl chloride content of about 90 to 98 weight percent, and about 2 to 10 weight percent propylene an intrinsic viscosity of about 0.5 to 1.5 dl/g., and a melt flow rate of at least about 0.1 dg/min., (b) about 8 to 10 parts, for each 100 parts by weight of the copolymer, of butadiene-1,3, (c) about 1 to 4 parts, for each 100 parts by weight of the copolymer, of alpha methacrylonitrile, and (d) 0 to about 3.5 parts, for each 100 parts by weight of the copolymer, of styrene, said copolymer having a haze value not in excess of 25 percent as determined by ASTM D1003.

2. The graft copolymer of claim 1 wherein said alpha-methacrylonitrile is present in an amount of about 1.5 to 3 parts for each 100 parts by weight of said copolymer.

3. The graft copolymer of claim 2 wherein said styrene is present in an amount of about 1.5 to 3 parts for each 100 parts by weight of said copolymer.

4. The graft copolymer of claim 3 wherein said vinyl chloride-propylene copolymer has an intrinsic viscosity of about 0.55 to 0.95 dl./g. and a melt flow rate of at least about 1 dg./min.

5. The graft copolymer of claim 4 wherein said vinyl chloride-propylene copolymer contains about 93 to 97 weight percent polymerized vinyl chloride.

* * * * *